(12) United States Patent
Martinez et al.

(10) Patent No.: US 12,018,643 B2
(45) Date of Patent: Jun. 25, 2024

(54) WIND TURBINE ROTOR BLADE SPAR CAP WITH EQUIPOTENTIAL BONDING

(71) Applicant: Vestas Wind Systems A/S, Aarhus N (DK)

(72) Inventors: Caetano Belda Martinez, Herning (DK); Diego Arthur Silva, Herning (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/549,206

(22) PCT Filed: Mar. 8, 2022

(86) PCT No.: PCT/DK2022/050038
§ 371 (c)(1),
(2) Date: Sep. 6, 2023

(87) PCT Pub. No.: WO2022/188934
PCT Pub. Date: Sep. 15, 2022

(65) Prior Publication Data
US 2024/0151207 A1 May 9, 2024

(30) Foreign Application Priority Data
Mar. 9, 2021 (DK) .......................... PA 2021 70104

(51) Int. Cl.
*F03D 1/06* (2006.01)
*B29C 70/88* (2006.01)
*B29L 31/08* (2006.01)

(52) U.S. Cl.
CPC .......... *F03D 1/0682* (2023.08); *B29C 70/882* (2013.01); *B29L 2031/085* (2013.01);
(Continued)

(58) Field of Classification Search
CPC .... F03D 1/0681; F03D 1/0682; F03D 1/0675; F03D 80/30; F03D 80/301;
(Continued)

(56) References Cited

U.S. PATENT DOCUMENTS 9,895,833 B2 * 2/2018 Cinquin .................... B64C 1/12
10,294,925 B2 * 5/2019 Klein .................... F03D 1/0675
(Continued)

FOREIGN PATENT DOCUMENTS

DK 201770744 A1 10/2018
EP 3418556 A1 12/2018
(Continued)

OTHER PUBLICATIONS

Danish Patent and Trademark Office, examination report issued in corresponding DK Application No. PA 2021 70104, dated Aug. 31, 2021.
(Continued)

*Primary Examiner* — Sang K Kim
(74) *Attorney, Agent, or Firm* — Wood Herron & Evans LLP (57) ABSTRACT

A wind turbine rotor blade spar cap, the spar cap having a length and comprising: a stack comprising a plurality of layers of conductive material and at least one intermediate layer, wherein the layers of conductive material each have a length along the length of the spar cap in a first direction, wherein the intermediate layer is arranged between adjacent layers of the conductive material, wherein the intermediate layer includes a fibre fabric material having: a first edge extending in the first direction, a conductive portion having conductive fibres oriented in the first direction, a first border portion between the first edge and the conductive portion, the first border portion having a plurality of non-conductive fibres oriented in the first direction and no conductive fibres
(Continued)

oriented in the first direction, and cross fibres oriented to cross the conductive fibres and the non-conductive fibres, and wherein the intermediate layer is bonded with the adjacent layers of the conductive material and is electrically coupled to the adjacent layers of conductive material so as to equipotentially bond the adjacent layers of the conductive material via the conductive portion of the intermediate layer.

14 Claims, 6 Drawing Sheets

(52) U.S. Cl.
CPC ............... *F05B 2280/2001* (2013.01); *F05B 2280/2006* (2013.01); *F05B 2280/6003* (2013.01)

(58) Field of Classification Search
CPC ...... F05B 2280/2001; F05B 2280/2006; F05B 2280/6003; B29C 70/88; B29C 70/882; B29L 2031/085

See application file for complete search history.

(56) References Cited

U.S. PATENT DOCUMENTS

| | | | |
|---|---|---|---|
| 11,141,927 B2* | 10/2021 | Ogale | B29C 65/364 |
| 11,746,744 B2* | 9/2023 | Lykkegaard | F03D 1/0675 |
| | | | 416/146 R |
| 2013/0102217 A1* | 4/2013 | Jeon | D03D 15/47 |
| | | | 442/205 |
| 2016/0221272 A1 | 8/2016 | Koefoed, et al. | |
| 2017/0082089 A1 | 3/2017 | Yarbrough et al. | |
| 2019/0039337 A1 | 2/2019 | Nielsen et al. | |
| 2020/0408190 A1 | 12/2020 | García Ayerra et al. | |
| 2021/0404443 A1* | 12/2021 | Thwaites | F03D 80/30 |
| 2023/0016436 A1* | 1/2023 | Jespersen | B29C 70/345 |

FOREIGN PATENT DOCUMENTS

| | | |
|---|---|---|
| KR | 20140072560 A | 6/2014 |
| WO | 2020103991 A1 | 5/2020 |

OTHER PUBLICATIONS

International Searching Authority, International Search Report and Written Opinion issued in PCT Application No. PCT/DK2022/050038, dated Jun. 24, 2022.

* cited by examiner

WIND TURBINE ROTOR BLADE SPAR CAP WITH EQUIPOTENTIAL BONDING

FIELD OF THE INVENTION

The present invention relates to a wind turbine rotor blade spar cap, to a fibre fabric material for a wind turbine blade spar cap, and to a method of manufacturing a wind turbine rotor blade spar cap.

BACKGROUND OF THE INVENTION

A wind turbine converts kinetic energy of the wind into electrical energy. A generator converts the wind energy captured by a rotor having one or more rotor blades into electrical energy that is usually supplied to a utility grid. The generator is housed in a nacelle together with the various components required to operate and optimize the performance of the wind turbine. A tower supports the load presented by the nacelle and the rotor. In a horizontal axis wind turbine (HAWT) the rotor blades extend radially outwardly from a central hub which rotates about a longitudinal axis aligned generally horizontally. In operation, the blades are configured to interact with the passing air flow to produce lift that causes the rotor to rotate within a plane substantially perpendicular to the direction of the wind. A conventional rotor blade is made from an outer shell and one or more inner spars in a hollow space bounded by the outer shell. The spar serves to transfer loads from the rotating blade to the hub of the wind turbine. Such loads include tensile and compressive loads directed along the length of the blade arising from the circular motion of the blade and loads arising from the wind which are directed along the thickness of the blade, i.e. from the windward side of the blade to the leeward side. The spar may typically have a hollow tubular section, e.g. generally rectangular hollow tubular section, or a beam section, e.g. I-beam, C-beam, H-beam, Y-beam, X-beam, etc., with one or more shear webs extending between spar caps. The spar caps may be incorporated into the outer shell or may be attached to the outer shell.

The spar cap may include pultruded fibrous strips of material. Pultrusion is a continuous process similar to extrusion, wherein fibres are pulled through a supply of liquid resin and then heated in an open chamber where the resin is cured. The resulting cured fibrous material is of constant cross section but, since the process is continuous, the material once formed may be cut to any arbitrary length. WO 2013/087078 describes a wind turbine blade with an elongate reinforcing structure comprising a stack of pultruded fibrous composite strips. The pultruded fibres are carbon fibres and extend almost the full length of the blade from root to tip.

The general trend in the wind turbine industry over the past several years has been for wind turbine blades to be made longer. The longer the blades, the larger the rotor and the more wind energy can be captured, improving the efficiency of an individual wind turbine.

Wind turbines are susceptible to lightning strikes. It is common for a wind turbine to include a lighting protection system, which electrically couples the wind turbine components to the ground. The blades, and in particular the blade tips, are particularly susceptible to lighting strikes. The blades therefore typically include a metallic foil, or surface protection layer (SPL), incorporated into the outer shell near the outer surface of the blade. The metallic foil may cover only a portion or substantially the entire blade outer surface. Additionally, or alternatively, the lightning protection system may include one or more discrete lightning receptors. The metallic foil and/or the lightning receptors on the blade are all electrically connected through the tower to ground.

Although lightning strikes have a natural tendency, due to their high frequency, to follow along the outside surface of a structure, such as the rotor blade, the presence of conductive fibres in the blade shell may cause unwanted discharges when a lightning strike occurs that could cause damage to the blade shell. This problem may be exacerbated where the conductive fibres extend along a substantial length of the rotor blade, especially for a long blade.

In order to reduce the prospect of high electrical potentials developing between adjacent strips of pultruded material, a conductive interleave may be arranged between the strips of pultruded material in order to equipotentially bond the strips. However, where the conductive interleave is a fabric material, conductive fibres may separate from the bulk of the fabric material during manufacture and may thereby create undesirable electrical coupling to nearby parts.

SUMMARY OF THE INVENTION

A first aspect of the invention provides a wind turbine rotor blade spar cap, the spar cap having a length and comprising: a stack comprising a plurality of layers of conductive material and at least one intermediate layer, wherein the layers of conductive material each have a length along the length of the spar cap in a first direction, wherein the intermediate layer is arranged between adjacent layers of the conductive material, wherein the intermediate layer includes a fibre fabric material having: a first edge extending in the first direction, a conductive portion having conductive fibres oriented in the first direction, a first border portion between the first edge and the conductive portion, the first border portion having a plurality of non-conductive fibres oriented in the first direction and no conductive fibres oriented in the first direction, and cross fibres oriented to cross the conductive fibres and the non-conductive fibres, and wherein the intermediate layer is bonded with the adjacent layers of the conductive material and is electrically coupled to the adjacent layers of conductive material so as to equipotentially bond the adjacent layers of the conductive material via the conductive portion of the intermediate layer.

Overall, the fibre fabric material may act to promote the infusion of resin matrix material between the strips of conductive material in order to bond the strips of conductive material together. By providing a conductive portion of the fibre fabric material, the adjacent layers of conductive material may be equipotentially bonded such that undesirable discharges or arcs within the spar cap may be avoided. The border portion may provide a buffer so that, in the case that fibres separate from the bulk material during resin infusion of the blade material, or during layup of the blade material, as loose fibres, the loose fibres are likely to be non-conductive and so are unlikely to create undesirable electrical connections.

The first border portion may have a width perpendicular to the first direction, the width of the first border portion being at least 5 millimetres.

The conductive fibres may be carbon fibres.

All conductive fibres of the fibre fabric material may be oriented in the first direction.

The non-conductive fibres may be glass fibres. In other examples they may be natural fibres.

The cross fibres may be non-conductive cross fibres, optionally the non-conductive cross fibres may be glass fibres or non-conductive natural fibres.

The cross fibres may be oriented perpendicular to the first direction. In another example, the cross fibres may be oriented at an angle to the first direction, such as at plus or minus 45 degrees.

The conductive material may comprise pultruded fibrous composite material, preferably carbon fibre reinforced plastic.

The wind turbine rotor blade spar cap may further comprise alternating layers of the conductive material and the intermediate layer.

The fibre fabric material may further comprise a second edge oriented in the first direction, the second edge being opposite the first edge, and a second border portion between the second edge and the conductive portion, the second border portion having a plurality of non-conductive fibres oriented in the first direction and no conductive fibres oriented in the first direction.

The second border portion may have a width perpendicular to the first direction, the width of the second border portion may be at least 5 millimetres.

The fibre fabric material may be woven or stitched.

According to a second aspect of the invention, there is provided a wind turbine rotor blade including at least one wind turbine rotor blade spar cap according to the first aspect.

A third aspect of the invention provides a method of manufacturing a wind turbine rotor blade spar cap, comprising: providing a plurality of layers of conductive material, each layer having a length along a length of the spar cap in a first direction; placing an intermediate layer between adjacent layers of the conductive material so as to form a stack, the intermediate layer including a fibre fabric material having: a first edge extending in the first direction; a conductive portion having conductive fibres oriented in the first direction, a first border portion between the first edge and the conductive portion, the first border portion having a plurality of non-conductive fibres oriented in the first direction and no conductive fibres oriented in the first direction; and cross fibres oriented to cross the conductive fibres and the non-conductive fibres; electrically coupling the intermediate layer to the adjacent layers of conductive material so as to equipotentially bond the adjacent layers of the conductive material via the conductive portion of the intermediate layer; and curing the stack to mechanically bond the intermediate layer to the adjacent layers of the conductive material.

The method may further comprise infusing the stack with resin prior to the curing.

The wind turbine rotor blade spar cap manufactured by the method according to the third aspect of the invention may be the wind turbine rotor blade spar cap of the first aspect of the invention.

A fourth aspect of the invention provides a fibre fabric material for a wind turbine blade spar cap, the fibre fabric material having: a length in a first direction, a width perpendicular to the length, the width being shorter than the length, a first edge extending in the first direction, a conductive portion having conductive fibres oriented in the first direction, a first border portion between the first edge and the conductive portion, the first border portion having a plurality of non-conductive fibres oriented in the first direction and no conductive fibres oriented in the first direction, and cross fibres oriented to cross the conductive fibres and the non-conductive fibres.

The fibre fabric material of the fourth aspect may be particularly suitable for mechanically and equipotentially bonding adjacent strips of conductive material and may have the advantages described above with reference to the first aspect.

The fibre fabric material of the fourth aspect may optionally have properties substantially similar to those optional properties described above with reference to the fibre fabric material of the wind turbine rotor blade spar cap of the first aspect.

BRIEF DESCRIPTION OF THE DRAWINGS

Embodiments of the invention will now be described with reference to the accompanying drawings, in which.

DETAILED DESCRIPTION OF EMBODIMENT(S)

In this specification, terms such as leading edge, trailing edge, pressure surface, suction surface, thickness, and chord are used. While these terms are well known and understood to a person skilled in the art, definitions are given below for the avoidance of doubt.

The term leading edge is used to refer to an edge of the blade which will be at the front of the blade as the blade rotates in the normal rotation direction of the wind turbine rotor.

The term trailing edge is used to refer to an edge of a wind turbine blade which will be at the back of the blade as the blade rotates in the normal rotation direction of the wind turbine rotor.

The chord of a blade is the straight line distance from the leading edge to the trailing edge in a given cross section perpendicular to the blade spanwise direction.

A pressure surface (or windward surface) of a wind turbine blade is a surface between the leading edge and the trailing edge, which, when in use, has a higher pressure than a suction surface of the blade.

A suction surface (or leeward surface) of a wind turbine blade is a surface between the leading edge and the trailing edge, which will have a lower pressure acting upon it than that of a pressure surface, when in use.

The thickness of a wind turbine blade is measured perpendicularly to the chord of the blade and is the greatest distance between the pressure surface and the suction surface in a given cross section perpendicular to the blade spanwise direction.

The term spanwise is used to refer to a direction from a root end of a wind turbine blade to a tip end of the blade, or vice versa. When a wind turbine blade is mounted on a wind turbine hub, the spanwise and radial directions will be substantially the same.

The term fibre used in this specification is intended to refer to a bundle of filaments and may refer to a part also known as a yarn, roving, tow or strand.

The term edge is used in this specification to refer to a part of a material. It is noted that the edge of the material is the physical limit of the fibres oriented in the direction of the edge. Fringes of the material, which may comprise fibres extending through and beyond the edge, may extend beyond the edge of the material. Put another way, an edge of a material oriented in a first direction may be defined by an outermost fibre of the material oriented in the first direction.

Figure 1:
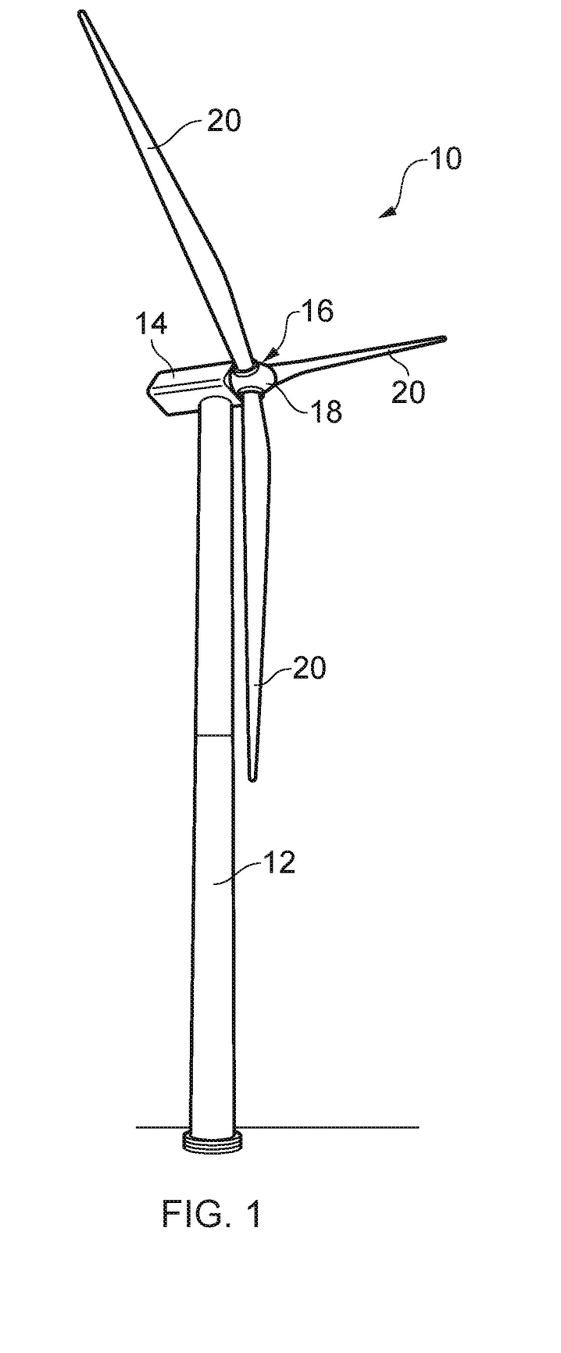
FIG. 1 shows a wind turbine.

FIG. 1 shows a wind turbine 10 including a tower 12 mounted on a foundation and a nacelle 14 disposed at the apex of the tower 12. The wind turbine 10 depicted here is an onshore wind turbine such that the foundation is embedded in the ground, but the wind turbine 10 could be an offshore installation in which case the foundation would be provided by a suitable marine platform.

A rotor 16 is operatively coupled via a gearbox to a generator (not shown) housed inside the nacelle 14. The rotor 16 includes a central hub 18 and a plurality of rotor blades 20, which project outwardly from the central hub 18. It will be noted that the wind turbine 10 is the common type of horizontal axis wind turbine (HAVVT) such that the rotor 16 is mounted at the nacelle 12 to rotate about a substantially horizontal axis defined at the centre at the hub 18. While the example shown in FIG. 1 has three blades, it will be realised by the skilled person that other numbers of blades are possible.

When wind blows against the wind turbine 10, the blades 20 generate a lift force which causes the rotor 16 to rotate, which in turn causes the generator within the nacelle 14 to generate electrical energy.

Figure 2:
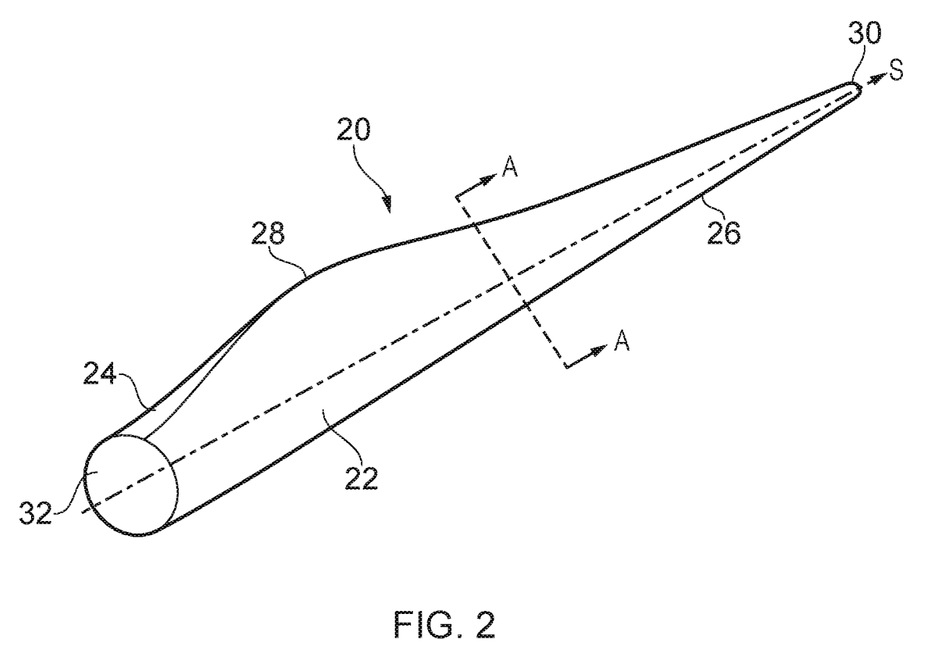
FIG. 2 shows a wind turbine blade.

FIG. 2 illustrates one of the wind turbine blades 20 for use in such a wind turbine. Each of the blades 20 has a root end 32 proximal to the hub 18 and a tip end 30 distal from the hub 18. The blade 20 is arranged to extend away from the hub 18 in a spanwise direction S. A leading edge 26 and a trailing edge 28 extend between the root end 32 and tip end 30, and each of the blades 20 has a respective aerodynamic high pressure surface 22 (i.e. the pressure surface) and an aerodynamic low pressure surface (i.e. the suction surface) 24 extending between the leading and trailing edges of the blade 20.

Each blade has a cross section which is substantially circular near the root end 32, because the blade near the root must have sufficient structural strength to support the blade outboard of that section and to transfer loads into the hub 18. The blade 20 transitions from a circular profile to an aerofoil profile moving from the root end 32 of the blade towards the tip end 30. The blade may have a "shoulder", which is the widest part of the blade where the blade has its maximum chord. The blade 20 has an aerofoil profile of progressively decreasing thickness towards the tip end 30.

Figure 3:
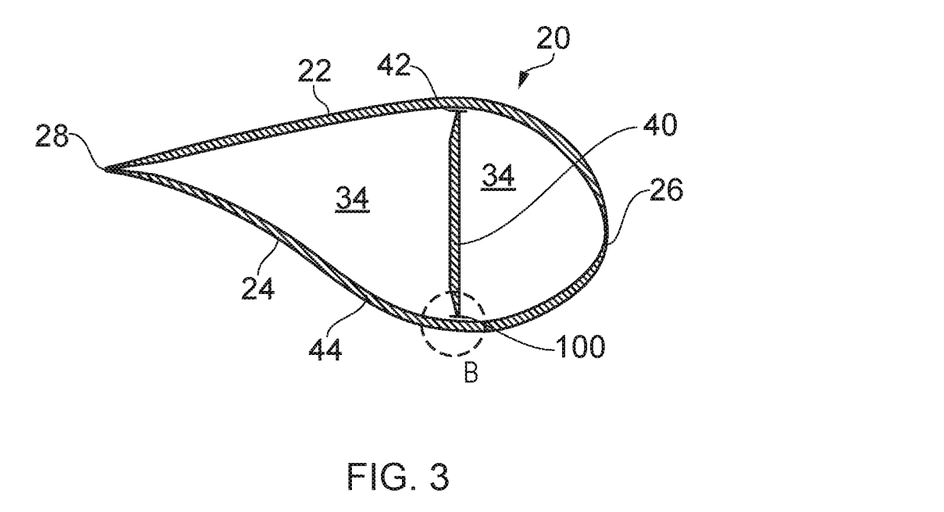
FIG. 3 shows a cross-section along A-A of FIG. 2 showing the outer shell and spar structure.

As shown in FIG. 3, which is a cross sectional view of the blade 20 taken along the line A-A, the wind turbine blade 20 includes an outer blade shell formed of an upper part 42 and a lower part 44, which together define a hollow interior space 34 with a shear web 40 extending internally between the upper and lower parts of the blade shell 42, 44. The blade shell parts may be two half-shells 42, 44 which are separately moulded before being joined together (at the leading edge 26 and the trailing edge 28) to form the blade 20. It will be appreciated that the blade shell 42, 44 need not be formed as two half-shells which are subsequently joined together but may be formed as a unitary shell structure, together with the shear web 40, in a "one shot" single shell process. The blade shell may include a laminate composite material such as glass fibre and/or carbon fibre for example.

Figure 4:
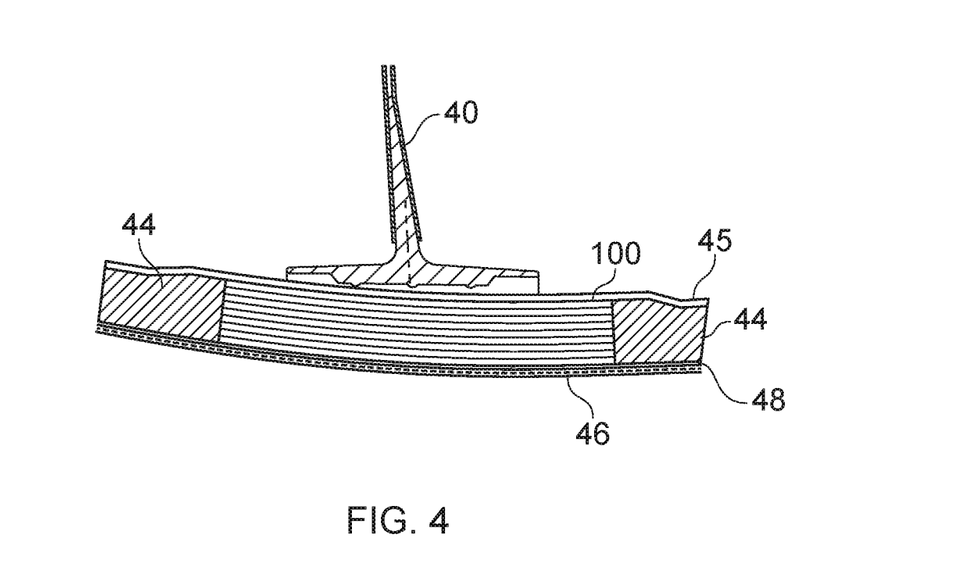
FIG. 4 shows detail B of the outer shell, spar cap and shear web in FIG. 3.

FIG. 4 shows a detail view of the region B, where the shear web 40 meets the blade shell 44. A spar cap 100 may be incorporated into the outer shell 44, as shown in FIG. 4, or may be attached to the outer shell 44. The spar cap 100 is an elongate reinforcing structure and may extend substantially along the full spanwise length of the blade 20 from the root end 32 to the tip end 30. The spar cap 100 includes conductive material, such as carbon fibres. For example, the spar cap may include pultruded fibrous strips of material such as pultruded carbon fibre composite material or other carbon fibre reinforced plastic material.

The spar cap 100 may include a stack of layers of the conductive material. The shear web 40 may be adhesively bonded to an inner surface of the spar cap 100. An outer surface of the spar cap 100 may sit adjacent a lightning conductor 46 in the outer surface of the blade shell 44. As shown in FIG. 4, the lightning conductor may be in the form of the metal foil 46 which may be separated from the outer surface of the spar cap 100 by one or more layers of insulating material 48, such as glass fibre reinforced plastic. One or more further layers of glass fibre reinforced plastic may be provided over the outside of the metallic foil 46. The layers collectively form an outer skin 48 of the blade shell 44. One or more further layers of glass fibre reinforced plastic provide an inner skin 45 of the blade shell 44 with a core material between the outer skin 48 and the inner skin 45. The core material may be a light structural foam, though other core materials such as wood, particularly balsa wood, and honeycomb may alternatively be used to provide a lightweight core material. It will be appreciated that a near identical connection may be made between the shear web 40 and the other side of the blade shell 42.

The blade materials are laid up in a wind turbine blade shell mould, where they are then infused with resin to bond the blade materials together. As is well known in the art, the blade materials are covered with a sealed vacuum bag which is evacuated, and then resin is infused into the blade materials. The resin is then cured which may be at an elevated temperature. This is known as a vacuum assisted resin transfer moulding (VARTM) process.

Figure 5:
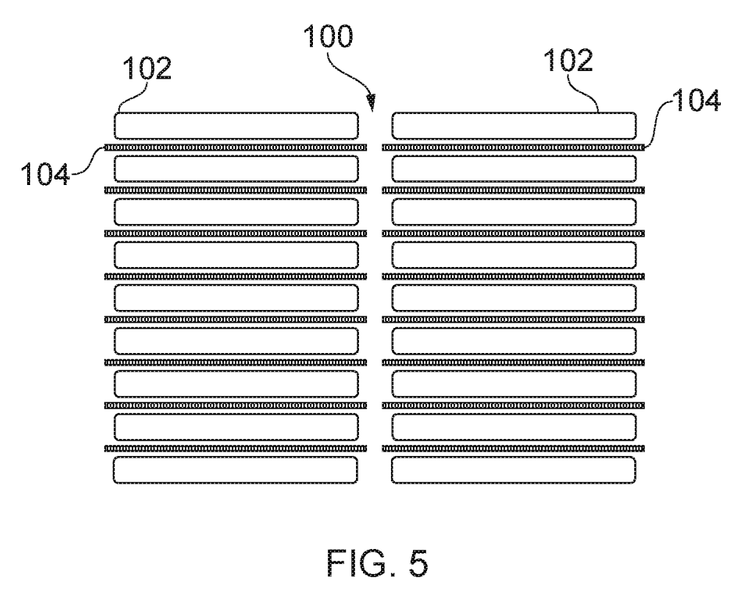
FIG. 5 shows schematically a cross-section of a stack of layers forming the spar cap.

FIG. 5 shows a cross-sectional view of the spar cap 100 before resin infusion, the cross-sectional view being taken such that it is viewed along a spanwise direction. The spar cap 100 has alternating layers of conductive material 102, which may be pultruded carbon fibre strips, interspersed with intermediate layers 104 of a fibre fabric material. The pultruded carbon fibre strips 102 may provide structural strength to the spar cap 100. However, it may be difficult for resin to infuse between the strips during the infusion process. The intermediate fibre fabric layers 104 establish a defined gap between the strips 102 so that resin can infuse between the strips. The intermediate layers 104 therefore act as an infusion promoting layer between the strips. The pultruded strips 102 are then bonded together so that the spar cap 100 may form a unitary structural part. The intermediate layers 104 help to ensure proper adhesion between the pultruded strips during infusion.

The pultruded strips 102 may be arranged in stacks, and as shown in FIG. 5, the spar cap may be formed of two or more neighbouring stacks of strips. This may be advantageous when a curved spar cap is desired.

The intermediate layers 104 may be wider than the pultruded carbon fibre strips 102 in a chordwise direction. The edges of the intermediate layers 104 may therefore be spaced from the pultruded strips 102 when the intermediate layers 104 are laid up. This accommodates for misalignments when the intermediate layers 104 are placed on the carbon fibre strips 102.

After curing of the spar cap 100, a cured spar cap may be formed.

Due to the conductive nature of carbon fibre, electrical potential differences must be avoided between the pultruded carbon fibre strips 102. Potential differences may be disadvantageous as they may lead to arcing within the spar cap 100, which may damage the spar cap. It is therefore desirable that the intermediate layers 104 are electrically conductive in a through-thickness direction such that the carbon fibre pultruded strips 102 may be equipotentially bonded and so potential differences may be avoided.

Figure 6A:
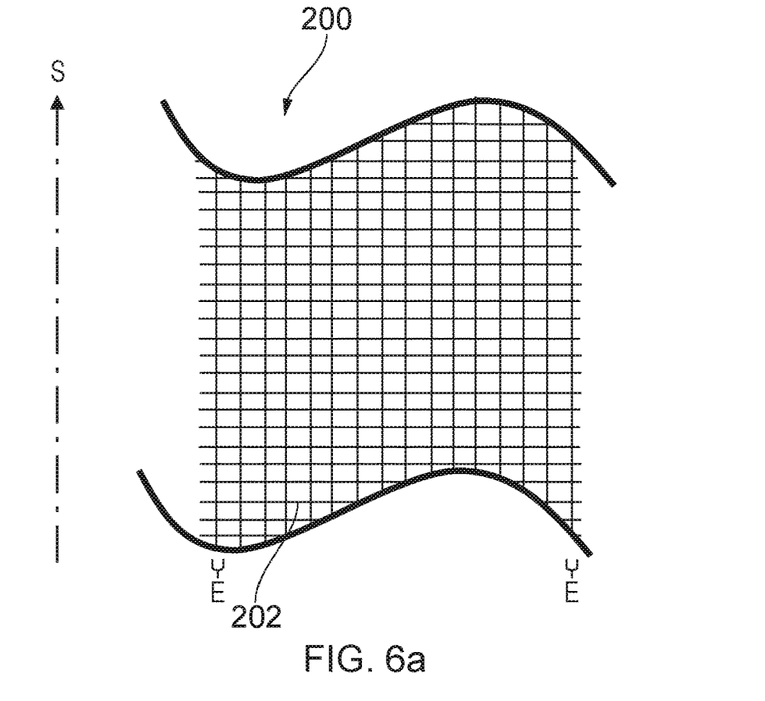
FIG. 6*a* shows a schematically a known fibre fabric material prior to resin infusion.

FIG. 6a shows a schematic planform view of a known fibre fabric material 200 prior to resin infusion. The fibre fabric material comprises carbon fibre strands 202 oriented in both a first direction S, which may be a spanwise direction when the fibre fabric material is within to a wind turbine blade spar cap, and a crosswise direction perpendicular to the first direction. As is illustrated in FIG. 6a, the fibre fabric material 200 may extend further in a spanwise direction S than in a perpendicular, chordwise direction. The fibre fabric material 200 may therefore have a length in the first, spanwise direction S that is longer than a width in a perpendicular, chordwise direction.

The edges E of the fabric material 200 can be seen in FIG. 6a. The edges E are defined by the outermost fibres 202 oriented in the first direction S and fringes formed by the ends of the crosswise fibres 202 protrude further than the edges.

Figure 6B:
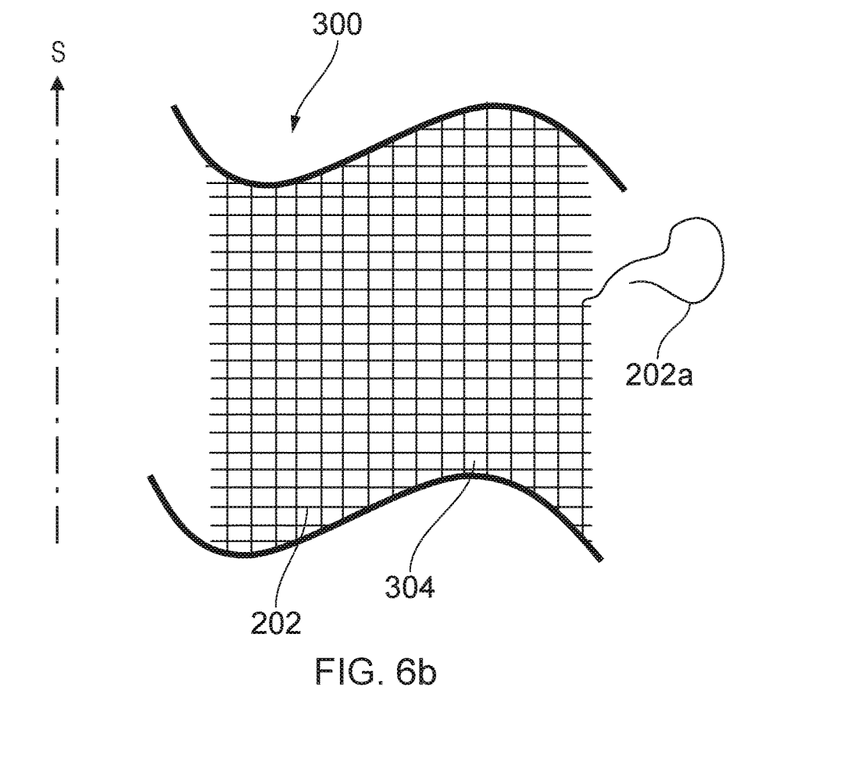
FIG. 6*b* shows schematically a known fibre fabric material after resin infusion.

FIG. 6b shows the fibre fabric material 200 after resin infusion, where an infused fibre fabric material 300 is formed. It will be understood that the infused fibre fabric material 300 may be within a wind turbine blade spar cap and that therefore FIG. 6b may be considered as a cutaway view of a wind turbine blade spar cap.

The infused fibre fabric material 300 has carbon fibres 202 as described with reference to FIG. 6a and a matrix material 304, such as an epoxy resin, which may be applied to the fibre fabric material via resin infusion. However, due to the nature of the fabric material, during the infusion process a fibre may slip off from the adjacent fibres and may become a loose fibre 202a, as shown in FIG. 6b. Where the loose fibre 202a is a conductive fibre, this may be disadvantageous as the loose fibre 202a may electrically couple the fibre fabric material to an adjacent structure, such as a heating element for de-icing the blade, or any other electrical sensitive component. Further, even where there is no electrical coupling to an adjacent component formed, the unpredictable nature of loose fibres may allow arcing to occur through a matrix material such that the loose fibre 202a may arc to itself or to the bulk of the fibre fabric material 300 during a lightning strike.

Commonly, when loose fibres such as the loose fibre 202a are identified, the fibre must be removed by cutting out the portion of the matrix material having the loose fibre and may require a patch repair on the blade.

Figure 7A:
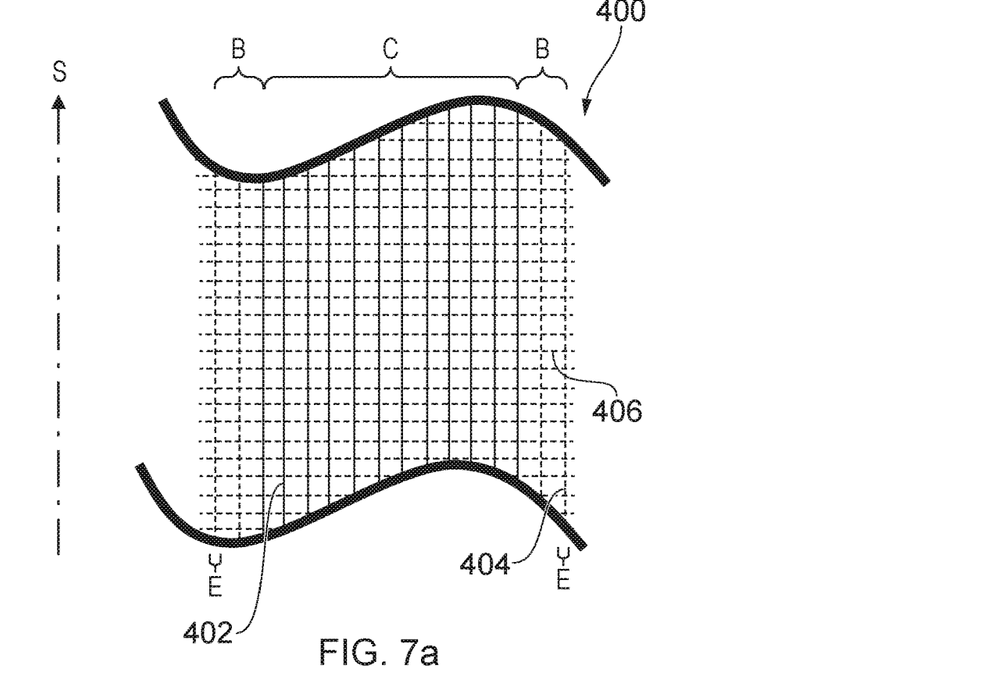
FIG. 7*a* shows schematically a fibre fabric material prior to resin infusion.

In order to alleviate issues resulting from loose fibres, the present inventors have provided an intermediate layer 104 in the form of a new fibre fabric material 400, shown in FIG. 7a. The fibre fabric material 400 has conductive fibres 402, which may be carbon fibres, oriented in a first direction S, which may be a spanwise direction when the fibre fabric material 400 is laid up within a wind turbine blade spar cap, the conductive fibres 402 being arranged adjacent to each other across a conductive portion C of the material 400. The material 400 also has border portions B adjacent the edges of the fibre fabric material 400, arranged between the conductive fibres 402 oriented in the first direction S and the edges E of the material 400. The border portions B contain non-conductive fibres 404 (shown as dashed lines) oriented in the first direction S and the border portions contain no conductive fibres.

The edges E are free of conductive fibres. As described above, the edges E, oriented in the first direction S, are defined by the outermost fibres oriented in the first direction S, which are non-conductive fibres 404. Fringes formed of the cross fibres 406 may protrude beyond the edges E.

The fibre fabric material 400 also has cross fibres 406 oriented perpendicular to the first direction S. The cross fibres 406 may be non-conductive fibres, such as glass fibres, and the non-conductive nature of the cross fibres 406 may also mean that, in the case that a cross-fibre 406 is pulled out to become a loose fibre, the loose fibre is not a conductive fibre and so an undesirable electrical connection should not be formed.

The fibre fabric material 400 may be woven or stitched. A stitched material may be advantageous as it may lie flatter than a woven material, improving the structure of the stacks of layers within the spar cap 100. However, a woven material may be advantageous as the woven nature of the conductive fibres 402 may improve conductivity through the thickness of the fibre fabric material 400.

Figure 7B:
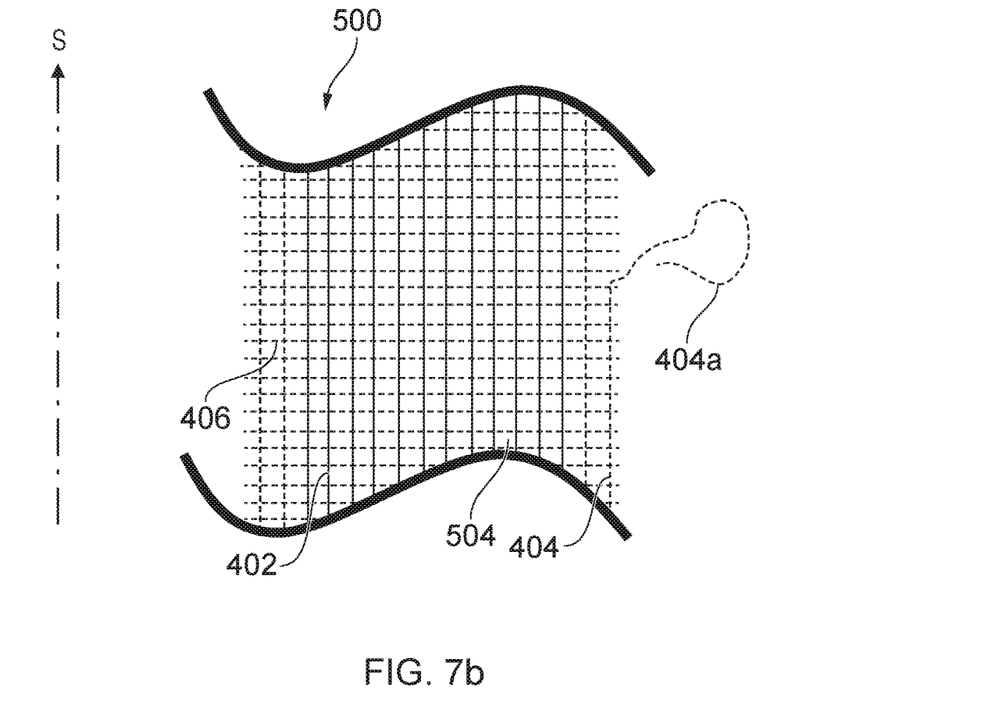
FIG. 7*b* shows schematically a fibre fabric material after resin infusion.

FIG. 7b shows an infused fibre fabric material 500, where a matrix material 504 has been infused through the fibre fabric material. The resin infusion process may be substantially similar to the processes described above with reference to FIG. 6b. In this case, a loose thread 404a has formed during the resin infusion. However, since the loose thread 404a is non-conductive, the prospect of an undesirable electrical connection being formed is reduced.

The widths of the first border portions B (which are the border portions at the two edges of the material oriented in the spanwise direction, the border portions having widths in the chordwise direction, perpendicular to the spanwise direction), may be at least 5 millimetres. This may be advantageous where multiple loose threads may be formed from one side of the material. For this reason, the border portions may each comprise a plurality of non-conductive fibres oriented in the first direction, optionally at least 5 non-conductive fibres oriented in the first direction. By providing wider border portions having higher numbers of non-conductive threads, the prospect of undesirable electrical connections being formed by loose threads is further reduced.

By having non-conductive border portions adjacent to both edges E, the fabric material 500 may be agnostic to the way up in which it is oriented as it is laid and undesirable electric connections from either edge may be avoided.

The fibre fabric material 500 may have at least 10, optionally at least 30, conductive fibres oriented in the first direction within the conductive portion C. This may provide a high level of conductivity through the thickness of the material, to ensure equipotential bonding between adjacent carbon fibre pultruded strips. The conductive fibres may therefore extend across a width of at least 10 millimetres, preferably at least 130 millimetres.

Although the invention has been described above with reference to one or more preferred embodiments, it will be appreciated that various changes or modifications may be made without departing from the scope of the invention as defined in the appended claims.

The invention claimed is:

1. A wind turbine rotor blade spar cap, the spar cap having a length and comprising:
   a stack comprising a plurality of layers of conductive material and at least one intermediate layer,
   wherein the layers of conductive material each have a length along the length of the spar cap in a first direction,
   wherein the intermediate layer is arranged between adjacent layers of the conductive material,
   wherein the intermediate layer includes a fibre fabric material having:
      a first edge (E) extending in the first direction,
      a conductive portion (C) having conductive fibres oriented in the first direction,
      a first border portion (B) between the first edge (E) and the conductive portion (C), the first border portion having a plurality of non-conductive fibres oriented in the first direction and no conductive fibres oriented in the first direction, and
      cross fibres oriented to cross the conductive fibres and the non-conductive fibres, and
   wherein the intermediate layer is bonded with the adjacent layers of the conductive material and is electrically coupled to the adjacent layers of conductive material so as to equipotentially bond the adjacent layers of the conductive material via the conductive portion (C) of the intermediate layer.

2. The wind turbine rotor blade spar cap of claim 1, wherein the first border portion has a width perpendicular to the first direction, the width of the first border portion being at least 5 millimetres.

3. The wind turbine rotor blade spar cap of claim 1, wherein the conductive fibres are carbon fibres.

4. The wind turbine rotor blade spar cap of claim 1, wherein all conductive fibres of the fibre fabric material are oriented in the first direction.

5. The wind turbine rotor blade spar cap of claim 1, wherein the non-conductive fibres are glass fibres.

6. The wind turbine rotor blade spar cap of claim 1, wherein the cross fibres are non-conductive cross fibres, optionally wherein the non-conductive cross fibres are glass fibres.

7. The wind turbine rotor blade spar cap of claim 1, wherein the cross fibres are oriented perpendicular to the first direction.

8. The wind turbine rotor blade spar cap of claim 1, wherein the conductive material comprises pultruded fibrous composite material, preferably carbon fibre reinforced plastic.

9. The wind turbine rotor blade spar cap of claim 1, further comprising alternating layers of the conductive material and the intermediate layer.

10. The wind turbine rotor blade spar cap of claim 1, wherein the fibre fabric material further comprises a second edge oriented in the first direction, the second edge being opposite the first edge, and a second border portion between the second edge and the conductive portion, the second border portion having a plurality of non-conductive fibres oriented in the first direction and no conductive fibres oriented in the first direction.

11. The wind turbine rotor blade spar cap of claim 10, wherein the second border portion has a width perpendicular to the first direction, the width of the second border portion being at least 5 millimetres.

12. The wind turbine rotor blade spar cap of claim 1, wherein the fibre fabric material is woven or stitched.

13. A wind turbine rotor blade including at least one wind turbine rotor blade spar cap according to claim 1.

14. A method of manufacturing a wind turbine rotor blade spar cap, comprising:
   providing a plurality of layers of conductive material, each layer having a length along a length of the spar cap in a first direction;
   placing an intermediate layer between adjacent layers of the conductive material so as to form a stack, the intermediate layer including a fibre fabric material having:
      a first edge extending in the first direction;
      a conductive portion having conductive fibres oriented in the first direction,
      a first border portion between the first edge and the conductive portion, the first border portion having a plurality of non-conductive fibres oriented in the first direction and no conductive fibres oriented in the first direction; and
      cross fibres oriented to cross the conductive fibres and the non-conductive fibres;
   electrically coupling the intermediate layer to the adjacent layers of conductive material so as to equipotentially bond the adjacent layers of the conductive material via the conductive portion of the intermediate layer; and
   curing the stack to mechanically bond the intermediate layer to the adjacent layers of the conductive material.

* * * * *